(12) United States Patent
Zhao et al.

(10) Patent No.: US 10,678,255 B2
(45) Date of Patent: Jun. 9, 2020

(54) SYSTEMS, METHODS AND APPARATUSES ARE PROVIDED FOR ENHANCED SURFACE CONDITION DETECTION BASED ON IMAGE SCENE AND AMBIENT LIGHT ANALYSIS

(71) Applicant: GM GLOBAL TECHNOLOGY OPERATIONS LLC, Detroit, MI (US)

(72) Inventors: Qingrong Zhao, Madison Heights, MI (US); Mohsen Khalili, Sterling Heights, MI (US); Jinsong Wang, Troy, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 15/896,104

(22) Filed: Feb. 14, 2018

(65) Prior Publication Data
US 2019/0250630 A1  Aug. 15, 2019

(51) Int. Cl.
*G05D 1/02* (2020.01)
*G06T 7/40* (2017.01)
*G06T 7/62* (2017.01)
*G06T 7/90* (2017.01)
*G06T 7/73* (2017.01)

(52) U.S. Cl.
CPC ......... *G05D 1/0246* (2013.01); *G05D 1/0238* (2013.01); *G06T 7/40* (2013.01); *G06T 7/62* (2017.01); *G06T 7/73* (2017.01); *G06T 7/90* (2017.01)

(58) Field of Classification Search
CPC ...... G05D 1/0238; G05D 1/0246; G06T 7/40; G06T 7/62; G06T 7/73; G06T 7/90
USPC .......................................................... 701/28
See application file for complete search history.

(56) References Cited

U.S. PATENT DOCUMENTS

| | | | |
|---|---|---|---|
| 5,359,666 A * | 10/1994 | Nakayama | G05D 1/0246 348/119 |
| 7,623,680 B2 | 11/2009 | Takahama et al. | |
| 8,184,159 B2 * | 5/2012 | Luo | G06K 9/00798 348/148 |
| 8,428,305 B2 * | 4/2013 | Zhang | B60W 30/00 382/103 |
| 9,774,790 B1 | 9/2017 | Kussel | |
| 2010/0097455 A1 * | 4/2010 | Zhang | G06K 9/00798 348/119 |
| 2011/0074955 A1 | 3/2011 | Kuehnle | |

(Continued)

*Primary Examiner* — Joshua E Rodden
(74) *Attorney, Agent, or Firm* — Lorenz & Kopf, LLP

(57) ABSTRACT

Systems, Methods and Apparatuses are provided for detecting surface conditions, which includes: an image scene captured by a camera wherein the image scene includes: a set of a plurality of regions of interest (ROIs); and a processor configured to receive the image scene to: extract at least a first and a second ROI from the set of the plurality of ROIs of the image scene; associate the first ROI with an above-horizon region and associate the second ROI with a surface region; analyze the first ROI and the second ROI in parallel for a condition related to an ambient lighting in the first ROI and for an effect related to the ambient lighting in the second ROI; and extract from the first ROI features of the condition of the ambient lighting and extract from the second ROI features of the effect of the ambient lighting on a surface region.

19 Claims, 14 Drawing Sheets

(56) References Cited

U.S. PATENT DOCUMENTS

| | | | | |
|---|---|---|---|---|
| 2016/0341848 A1* | 11/2016 | Nakamura | .......... | G06K 9/00791 |
| 2018/0194286 A1* | 7/2018 | Stein | ...................... | B60W 10/22 |
| 2019/0188495 A1* | 6/2019 | Zhao | ...................... | B60W 30/12 |
| 2019/0303692 A1* | 10/2019 | Nan | ...................... | G05D 1/0246 |
| 2020/0017083 A1* | 1/2020 | Casselgren | ............. | B60T 8/172 |

* cited by examiner

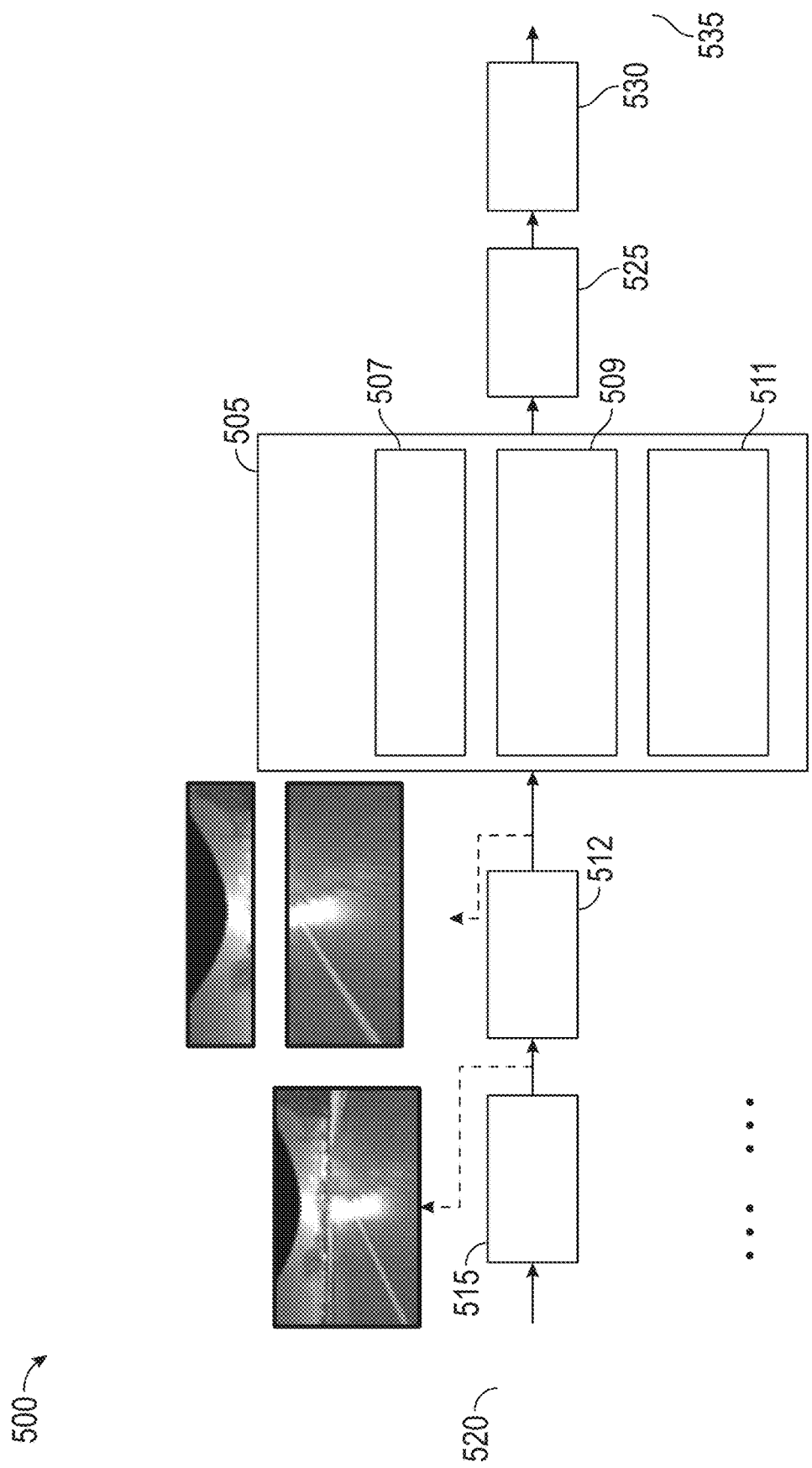

… (1)

SYSTEMS, METHODS AND APPARATUSES ARE PROVIDED FOR ENHANCED SURFACE CONDITION DETECTION BASED ON IMAGE SCENE AND AMBIENT LIGHT ANALYSIS

TECHNICAL FIELD

The technical field generally relates to image processing, and more particularly relates to systems, methods and apparatuses for surface condition detection based on capturing an entire image scene and incorporating ambient lighting analysis to enhance the detection of a variety of surface conditions captured in a region of interest (ROI) of the entire image to enhance vehicle performance and safety associated with the particular surface condition.

INTRODUCTION

The images of road surface conditions can appear to vary under different lighting conditions and this variation can pose obstacles in accurately detecting or attempting to detect a particular road surface condition. An ambient lighting condition analysis based on capturing an entire image scene that contain both surface and above road horizon information may be shown to be fruitful in enhancing detection of the road surface condition. That is, by analyzing camera images projected of entire scenes about a vehicle which contain surface regions as well as surrounding regions of above horizon regions including but not limit to the sky, trees and side surface regions; the effects of projections including shadows and lighting from the surroundings on the surface regions can also be analyzed along with analysis of the particular surface conditions for better identification of particular surface conditions. For example, sunlight or shadows projected on a plethora of road conditions including icy, wet, dry, non-icy, snow etc. types of road condition can be analyzed in captured camera images by using ambient light analysis of the entire captured scene.

However, generally image scene other than road surface and ambient lighting condition analysis, has not been incorporated into road surface or for that matter any surface condition detection and analysis; even though in instances, such scene and ambient light conditions often correlate to the change in the road surface condition of the images captured. Therefore, given this correlation to a change that occurs in images of the road surface condition, an enhanced road surface condition detection, may be achievable or may be provided in results for road surface condition detections, based on captured image scenes by incorporating ambient light condition analysis, than is currently available for the road surface condition detection. This can be particularly true but not limited too for detecting icy, dry, wet and snow road surface conditions because in icy, dry, wet and snow road surfaces there is often shown to be significant differences in lighting conditions which occur that an ambient light condition analysis incorporated in the road surface condition detection may counter balance or alleviate when detecting road surface conditions based on an image scene thereby yielding better road surface condition detection results.

An autonomous or semi-autonomous assisted vehicle is a vehicle that is capable of sensing its environment and navigating with little or no user input. An autonomous or semi-autonomous vehicle senses its environment using one or more sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle. The capabilities of environment sensing of an autonomous as well as a semi-autonomous or for that matter a conventional driver assisted vehicle would be enhanced with road surface condition detection based on image scene and ambient light analysis. That is, the capabilities of improved environment sensing benefit all types of vehicles currently in use or in future use and even have applicability to non-vehicle applications. For example, with the use of cameras mounted at intersections viewing road scenes and detecting road surface conditions associated with the viewed camera scenes.

Accordingly, it is desirable to incorporate ambient light condition analysis based on an image scene in the surface condition detection system, method and apparatus for a vehicle. In addition, it is desirable to provide surface condition detection systems, methods and apparatuses based on an image scene and ambient lighting condition analysis for autonomous, semi-autonomous and conventional vehicles. Also, it is desirable to provide such surface condition analysis for non-vehicular applications. Furthermore, other desirable features and characteristics of the present invention will become apparent from the subsequent detailed description and the appended claims, taken in conjunction with the accompanying drawings and the foregoing technical field and background.

SUMMARY

Systems, methods and apparatuses for detecting surface conditions is provided.

In one embodiment, a surface detection system for detecting surface conditions is provided. The surface detection system includes: an image scene captured by a camera wherein the image scene includes: a set of a plurality of regions of interest (ROIs); and a processor configured to receive the image scene to: extract at least a first and a second ROI from the set of the plurality of ROIs of the image scene; associate the first ROI with an above-horizon region and associate the second ROI with a surface region; analyze the first ROI and the second ROI in parallel for a condition related to an ambient lighting in the first ROI and for an effect related to the ambient lighting in the second ROI; and extract from the first ROI features of the condition of the ambient lighting and extract from the second ROI features of the effect of the ambient lighting on a surface region.

The surface detection system further includes: analyzing the second ROI to extract features of the effects of the ambient lighting on the surface region in common with features of the first ROI of the conditions of ambient lighting based on a plurality of image attributes wherein the extracted features include: a common set of features for both ROIs. The image attributes include: a set of one or more of a texture, a brightness and a color information. The surface detection system further includes: generating one or more common sets of features from both ROIs by combining each common set of features with one or more of each image attribute. The surface detection system, further includes: classifying by a classifier each of the common set of features to a particular surface type. The surface detection system, further includes: an autonomous, semi-autonomous, or non-autonomous vehicle system, or non-vehicular applications. The processor is configured to: determine, by a threshold related to values of pixels of the first ROI features of the condition of the ambient lighting and thresholds related to values of pixels of the second ROI features of the effect of the ambient lighting on the surface region.

In another embodiment, a method for detecting surface conditions is provided. The method includes: capturing an image scene by a camera wherein the image scene includes: a set of a plurality of regions of interest (ROIs); extracting, by a processor associated with the vehicle, at least a first and a second ROI from the set of the plurality of ROIs of the image scene; associating, by the processor, the first ROI with an above-horizon region and associating the second ROI with a surface region; analyzing, by the processor, the first ROI and the second ROI in parallel for a condition related to an ambient lighting in the first ROI and for an effect related to the ambient lighting in the second ROI; and extracting, by the processor, from the first ROI features of the condition of the ambient lighting and extracting, from the second ROI, features of the effect of the ambient lighting on a surface region.

The method further includes: an autonomous, semi-autonomous, non-autonomous driving method, or non-driving use. The method further includes: taking an action by the processor based on the feature of the surface condition or the effect on the surface related to vehicle control. The method further includes: taking an action by the processor based on the surface condition or the effect on the surface of sending notifications for notifying of a particular surface condition or effect on the surface. The method further includes: analyzing, by the processor, the second ROI to extract features of the effects of the ambient lighting on the surface region in common with features of the first ROI of the conditions of ambient lighting based on a plurality of image attributes wherein the extracted features include: a common set of features for both ROIs. The image attributes include: a set of one or more of a texture, a brightness and a color information. The method further includes: generating, by the processor, one or more common sets of features from both ROIs by combining each common set of features with one or more of each image attribute. The method further includes: analyzing the second ROI to extract features of the effects of the ambient lighting on the surface region in common with features of the first ROI of the effects of ambient lighting based on a plurality of image attributes wherein the extracted features include: a common set of features for both ROIs.

In yet another embodiment, a surface detection apparatus is provided. The surface detection apparatus includes: a camera for generating images wherein the images include: regions of interest (ROI); a processor module, configured to receive the images to: extract at least a first and a second ROI from the set of the plurality of ROIs of the image scene; associate the first ROI with an above-horizon region and associate the second ROI with a surface region; analyze the first ROI and the second ROI in parallel for a condition related to an ambient lighting in the first ROI and for an effect related to the ambient lighting in the second ROI; and extract from the first ROI features of the condition of the ambient lighting and extract from the second ROI features of the effect of the ambient lighting on a surface region.

The apparatus further includes: an autonomous, semi-autonomous or conventional driving apparatus. The apparatus further includes: a cloud connected apparatus to send messages of surface conditions to third party networks. The apparatus further includes: the processor is configured to: determine, by a threshold related to values of pixels of the first ROI features of the condition of the ambient lighting and thresholds related to values of pixels of the second ROI features of the effect of the ambient lighting on the surface region. The apparatus further includes: the processor is configured to: analyze the second ROI to extract features of the effects of the ambient lighting on the surface region in common with features of the first ROI of the effects of ambient lighting based on a plurality of image attributes wherein the extracted features include: a common set of features for both ROIs; generate one or more common sets of features from both ROIs by combining each common set of features with one or more of each image attribute; and classify, by a classifier, each of the common set of features to a particular surface type.

It is noted that in various embodiments, the method contains steps which correspond to the functions of one or more of the various embodiments of the surface condition detection system and apparatus described above.

BRIEF DESCRIPTION OF THE DRAWINGS

The exemplary embodiments will hereinafter be described in conjunction with the following drawing figures, wherein like numerals denote like elements, and wherein:

FIG. 5 is a diagram that illustrates a road surface detection system incorporating ambient lighting analysis, in accordance with various embodiments;

DETAILED DESCRIPTION

Figure 1:
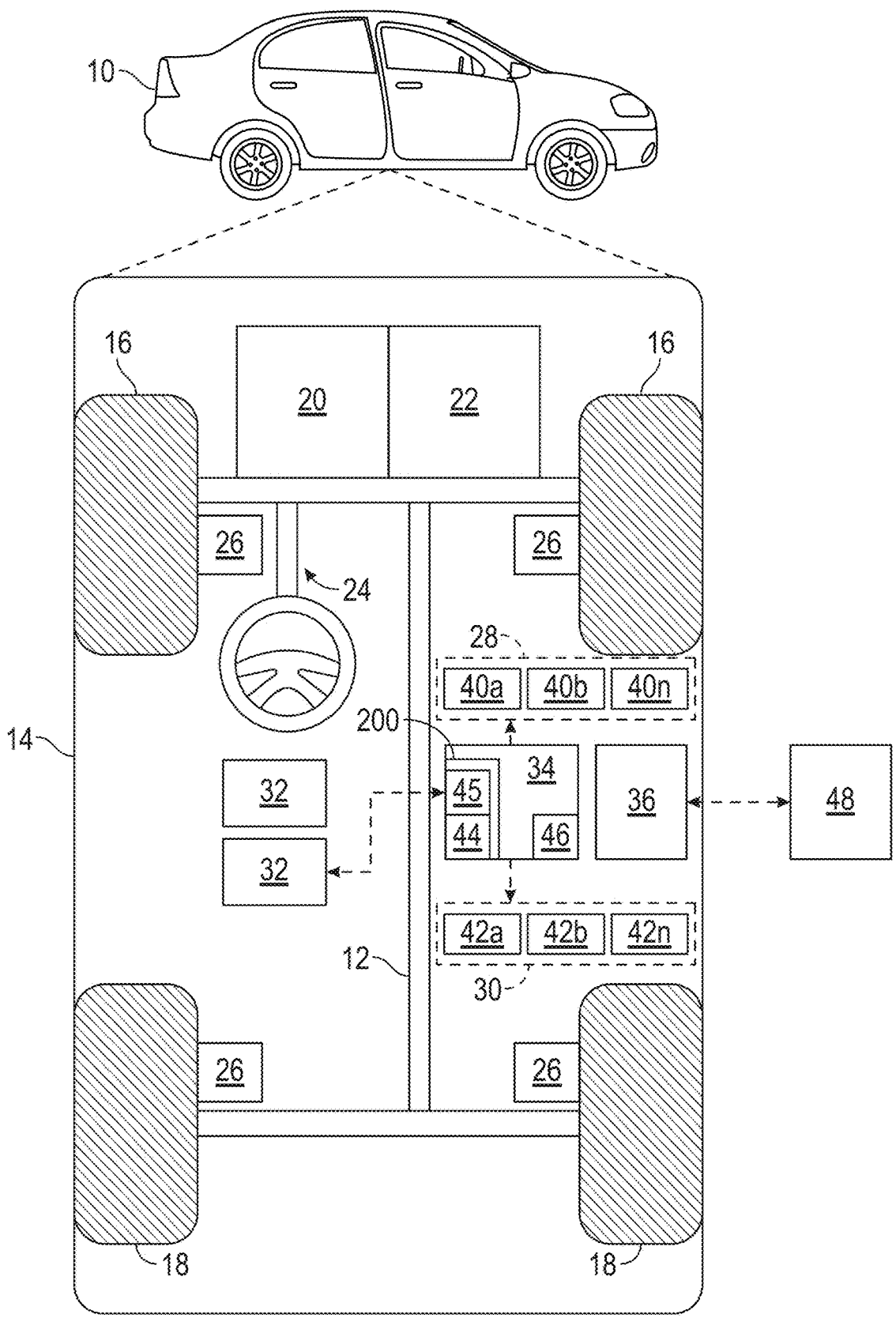
FIG. 1 is a functional block diagram illustrating a vehicle having a road surface detection system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The term "autonomous" means that the vehicle is performing the movement without intervention of a human, or semi-automatic, i.e., with some human interactions during the movement of the vehicle.

While the description in parts is directed to autonomous or semi-autonomous vehicles, it is contemplated that the functionalities described may be similarly applicable to non-autonomous vehicles and for even additional non-vehicle applications.

Further, references to "road" surface conditions should not be construed as limiting, and may be similar applicable to any "surface" condition including non-road surfaces, pavements, grass, rubber, cement, tile etc. surfaces. In addition, the region above the horizon of the road includes any area above the surface including the sky region. In other words, references to sky region or regions above the horizon of the road should be construed at least to include all surrounding not including the surface region of a particular surface.

To achieve high level automation, vehicles are often equipped with an increasing number of different types of devices for analyzing the environment around the vehicle, such as, for example, cameras or other imaging devices capturing imagery of the environment for surveying or detecting features within the environment, and the like. In practice, the different onboard devices are located at different locations onboard the vehicle and typically operate at different sampling rates or refresh rates, and as a result, capture different types of data and parameters corresponding to different points in time from different viewpoints or perspectives which result in a multitude or anomalies particularly when performing image processing applications.

As indicated, an ambient lighting condition, particularly when associated with the effects on road surface images has not generally been incorporated into road surface condition analysis, even though in instances, such ambient light conditions often correlate to changes in the surface images captured. Therefore, given this ambient light correlation which occurs; a more enhanced detection can be provided in the analysis of entire scenes images than is currently available in the present environment. In addition, during such enhanced analysis particularly in respect to surface image presentations, the different ambient lighting conditions have different RGB presentations in captured camera images. For example, the sky portions of a captured camera image reflect ambient light information in different ways. The effects of the sky reflection may be shown in the various examples as follows: in clear sky portions, the reflected clear sky portions may result in blue saturated high intensity pixels; in sunny sky portions, the reflected sunny sky portions may have very high intensities for all colors; in dark cloud reflected sky portions, the dark cloud reflected sky portion may have blue dominant non-saturated pixels; and in green trees within the reflected sky portion, the tree portions of the reflected sky portion may have green dominant pixels.

The ambient lighting conditions may also have significant effects on image presentation of captured camera images with respect to reflected portions of road surfaces. That is, the shadows on road surfaces can show pixel information of varying intensities of captured camera images. For example, shadows on snow and dry road surfaces can result in low intensity cyan-dominant (i.e. green plus blue) pixels. In instances, of shadows on wet and dry roads, intensities of low intensity yellow dominant (i.e. red and green) pixels may be presented in the captured camera images. Finally, in instances of sunlight on the road surface, intensities of yellow saturated high intensity pixels may be presented in the captured camera images. Hence, incorporation of ambient lighting effects on road surfaces into image analysis can provide additional information useful in detecting road conditions.

Various embodiments of the present disclosure provide systems and method that enable road surface condition detection in automotive sensing hardware when limitations in processing capabilities must be accounted for, when analyzing captured images subject to ambient light conditions analysis, in order to still maintain a robust and practical solution. For example, the availability of automotive grade hardware accelerators for hardware sensors is at best limited and hence hardware accelerators in the most part which are used in automotive sensors are derived from the consumer marketplace. Therefore, the necessary level of analysis for surface road condition detections must be achieved with consumer grade or less expensive sensing hardware.

Various embodiments of the present disclosure provide systems and method that enable road surface condition detection incorporating ambient light analysis in sufficiently practical approaches for use with consumer vehicles that use or require a certain or appropriate level of processor capability that is within the range of processor in use in the consumer automotive market. That is, the algorithms to support the ambient light detection analysis should not require an inordinate amount of computation not generally found in vehicles but should recognize the environmental limitations posed my processing capacities of vehicular processor systems, including for example constraints in power consumption, processing speeds, etc. and provide a lightweight and efficient computation solution.

Various embodiments of the present disclosure provide systems and method that enable road surface condition detection and ambient light analysis more robust to lighting conditions than customary approaches used with vision processing systems and further do not require unduly expensive hardware when compared with other sensing or detecting approaches. In addition, such systems should share vehicle camera set-up applications already in use by other standard feature applications in the vehicle. For example, this shared use will allow incorporation of the enhanced detection application incorporating ambient light conditions in legacy systems of vehicles not incorporating, in-efficiently incorporating, or incorporating to a limited extent ambient light detection analysis in image capture analysis.

Various embodiments of the present disclosure provide systems and method that enable road surface condition detection as part of a methodology or framework to enable by the algorithmic solutions disclosed to detect slippery road conditions by analysis of captured camera images.

Various embodiments of the present disclosure provide systems and method that enable road surface condition detection provide enhanced advisory notifications, warning alerts, as well as automated or assisted user controls when driving to improve vehicular operations. That is, to enhance the robustness and performance of active safety, driver assistance control systems, and the overall vehicle stability by the more precise operation of autonomous and semi-autonomous route planning features through the enhanced detecting of conditions on particular vehicle paths and appropriate control settings for conditions on these paths.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the road surface detection system incorporating ambient lighting analysis 200 is incorporated into the vehicle 10 (hereinafter referred to as the autonomous vehicle 10). The present description concentrates on an exemplary application in autonomous vehicle applications. It should be understood, however, that the road surface detection system incorporating ambient lighting analysis 200 described herein is envisaged to be used in conventional and semi-autonomous automotive vehicles including driver assist systems, as an example, that make use of lane perception information, such as lane departure warning systems and lane-keeping assistance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. In embodiments, the sensing devices 40a-40n include one or more cameras for obtaining images at a particular frame rate. The one or more cameras are mounted on the vehicle 10 and are arranged for capturing images of an exterior environment of the vehicle 10 (e.g. a sequence of images in the form of a video).

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes a redundant computer architecture of at least a processor 44 and a processor 45, were the processor 44 may be considered a primary processor and the processor 45 may be considered a backup processor. The processor 44 and the processor 45 are coupled to at least one computer readable storage device or media 46. The processor 44 and the processor 45 can be any custom made or commercially available processor, a central processing unit (CPU), a graphics processing unit (HW accelerator), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while both processors 44, 45 are powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processors 44 and the processor 45, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 4:
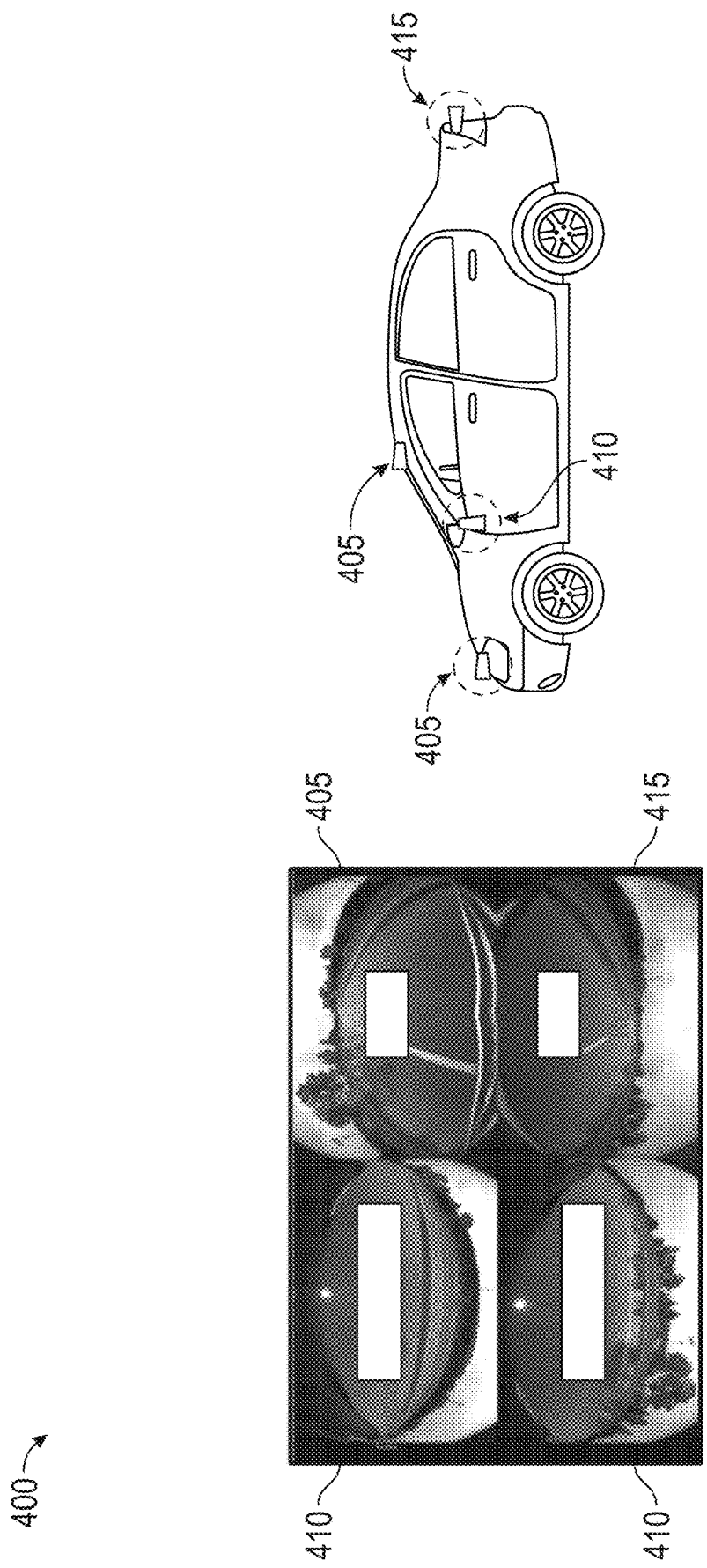
FIG. 4 is a diagram illustrating mounting of cameras for a vehicle for the road surface detection system in accordance with various embodiments.

In various embodiments, and with reference to FIG. 4, one or more instructions of the controller 34 are embodied in the road surface detection system 200 and, when executed by the processors 44, 45 are configured to receive input data and input parameter data and produce output data and output parameter data for use by an automated feature of the vehicle 10.

Figure 2:
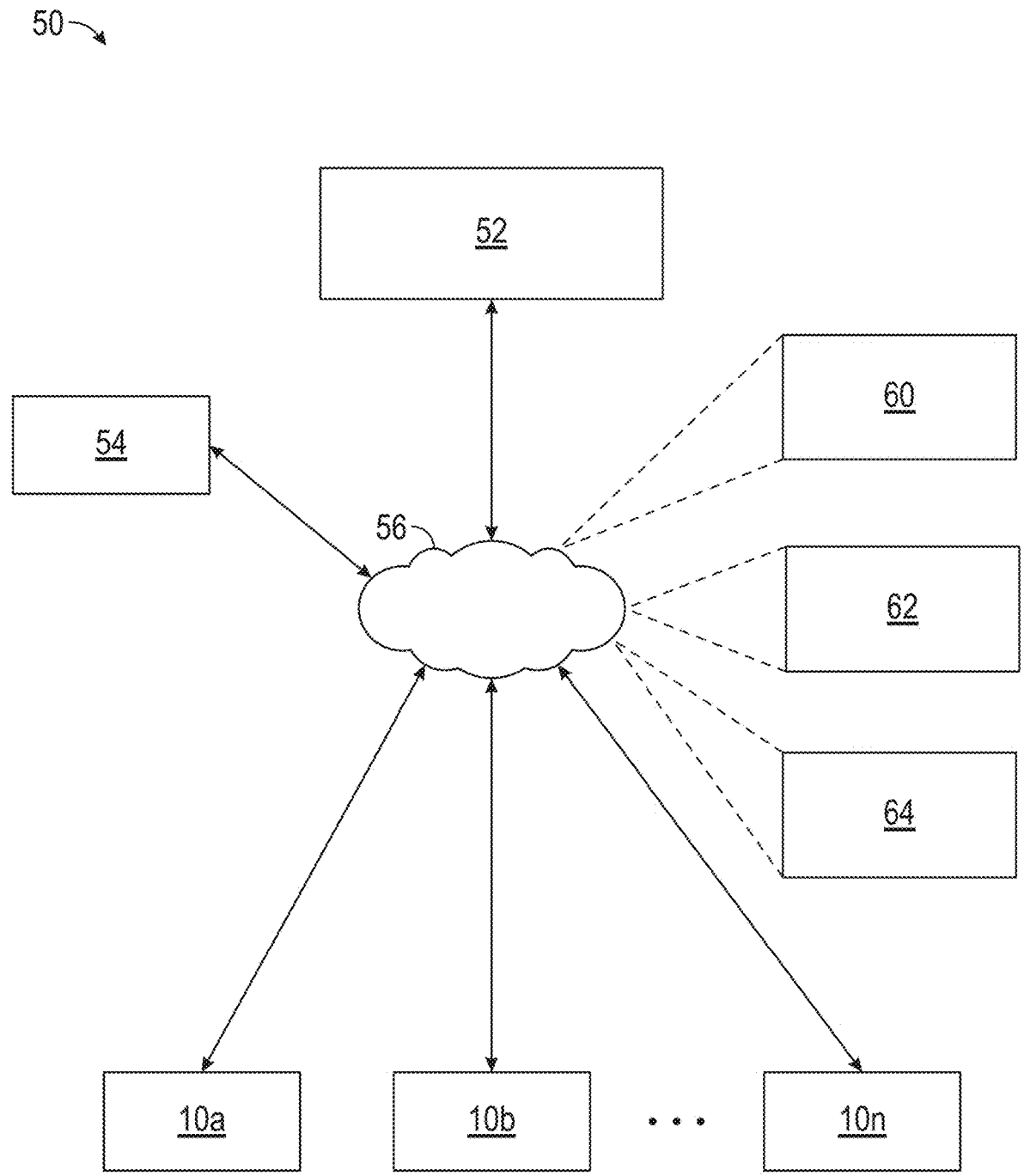
FIG. 2 is a functional block diagram illustrating a transportation system having one or more autonomous or semi-autonomous vehicles, in accordance with various embodiments.

The communication system 36 is configured to wirelessly communicate information to and from other entities 48, such as but not limited to, other vehicles ("V2V" communication) or infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

The subject matter described herein concerning the road surface detection system 200 incorporating ambient lighting analysis is not just applicable to autonomous driving systems, devices and applications, but also other driving systems having one or more automated features utilizing computer capabilities. Further, the road surface detection system 200 incorporating ambient lighting analysis is operable in other systems, devices and applications than the automotive sphere for detecting information from ambient lighting analysis in images.

Figure 3:
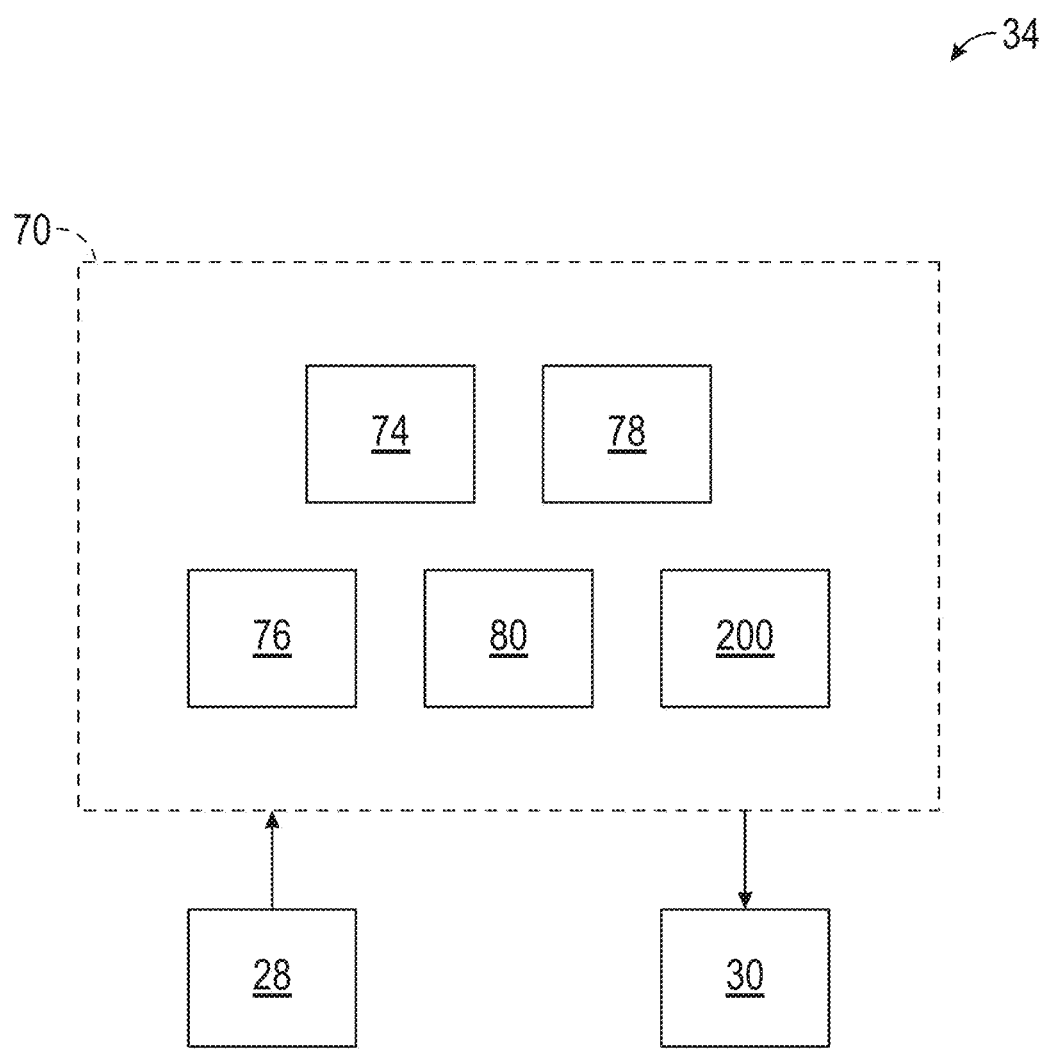
FIG. 3 is a dataflow diagram illustrating an autonomous or semi-autonomous driving system that includes a road surface detection system in an autonomous or semi-autonomous vehicle, in accordance with various embodiments.

In accordance with an exemplary autonomous driving application, the controller 34 implements an autonomous driving system (ADS) 70 as shown in FIG. 3. That is, suitable software and/or hardware components of the controller 34 (e.g., the processors 44, 45 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various exemplary embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the road surface detection system 200 incorporating ambient lighting analysis of FIG. 1 (and FIG. 5) may be included within the ADS 70 in autonomous driving systems and applications, for example, as part of the road surface detection system 200 incorporating ambient lighting analysis to enhance vehicle control in slippery surface conditions including snow and ice, and wet conditions. The road surface detection system 200 incorporating ambient lighting analysis is configured to output parameter data for use in various possible automated control modules that rely on feature detection such as image feature classification and localization. In some embodiments, the detected image features include parameter data for path planning and vehicle control of road feature parameter data (such as road boundaries and road markings including road side signs and traffic lights); lane feature parameter data (such as lane boundaries and lane markings); and surrounding objects parameter data (including pedestrians, other vehicles, buildings, etc.). Such detected image features parameter data is utilizable by the guidance system 78 to determine upon a trajectory for the vehicle 10. The vehicle control system 80 works with actuator system 30 to traverse such a trajectory.

In various exemplary embodiments, Wi-Fi, WiMAX or Bluetooth connected cameras and smart devices may be used in conjunction by sending additional images to the road surface detection system incorporating ambient lighting analysis 200 for use in detecting road surface conditions. For example, a passenger or driver using an app of a smart phone may be able to remotely capture road surface conditions with GPS tags embedded for sending via IP connectivity's to vehicle processing system for the adding to road surface condition detection.

In various exemplary embodiments, information from the road surface detection system incorporating ambient light analysis via the cloud network may be shared with other users, provided to third party databases, aggregated for further analysis, provided to third party mapping and traffic related applications, provided to social network applications, and sent to government traffic maintenance and support agencies. For example, such information could be sent to cloud sharing traffic applications like WAZE®, GOOGLE® MAPS, and INRIX® for use in auto-intelligent, route planning, route reporting, and other applications. In addition, automated tagging of information (such as to the header data packets) of images analyzed and adding of various taxonomies and classifications associated with the results of the road surface detection system incorporating ambient lighting analysis may be performed for addition information use and sharing. For example, captured images of particular road surfaces or scenes may be sent via the network cloud with descriptions of the road surface condition found in the captured image.

FIG. 4 illustrates exemplary mounting of cameras for a vehicle for the road surface detection system in accordance with various embodiments. In FIG. 4, there is shown a camera configuration 400 of cameras mounted at various locations on a vehicle. The camera configuration 400 includes a front camera 405, side cameras 410 and a rear camera 415. Additional cameras (not shown) may be mounted or integrated on the front/rear bumpers or the rear-view mirror behind the windshield. Side camera can be mounted or integrated in the side mirrors of the vehicle. In this particular camera configuration 400, images may be captured of image scenes surrounding the vehicle including, as an example, the road surface and imagery above the horizon road horizon area. That is, the front camera 400 may capture an image scene that includes a front view of the road surface in front of the vehicle which may include the road surface, an area above the road horizon, and areas on the sides of the road. Likewise, the other cameras of the side cameras 410 and rear camera 415 would capture similarly surrounding imagery in the direction of the camera. The capture scene images may be sent to the road surface detection system for further processing analysis with ambient lighting conditions.

FIG. 5 illustrates a road detection system incorporating ambient lighting analysis, in accordance with various embodiments. In particular, FIG. 5 shows a road surface detection system 400 in more detail with continued reference to FIGS. 1 to 4. FIG. 5 of a framework for ambient lighting analysis which includes a feature extraction module 505 with processors of various modules performing analysis of aspects of ambient lighting on conditions, effects on road surfaces and presentation of image analysis. That is, the feature extraction module includes an ambient light condition module 507 for analysis of ambient lighting conditions, an ambient lighting effects module 509 for analysis of ambient lighting effects on road surfaces, and an overall road surface presentation module 511 for analysis of overall road surface presentation. Camera images 520 which may include raw data for receiving camera images from image sensing devices of a vehicle. In an exemplary embodiment, the pipeline architecture employed, receives camera images 520 from image sensors (not shown) for pre-processing by a pre-processing module 515 for noise removal, image re-projection, downsizing, etc. After this initial pre-processing of the camera image, a region of interest (ROI) is identified of the camera image by the ROI extraction module 512.

While the exemplary embodiment describes two ROIs of a road surface and a sky, it is contemplated that this is not an exhaustive list of ROIs and the list of ROIs can be expanded dependent on locations, weather patterns, environment and other attributes found in camera images, or detection resolution requirements for the specific applications. In this instance, the ROI extraction module 512 extracts or determines two ROIs for further processing. The first ROI may include an upper image region of the camera image of sky area for weather and ambient lighting condition analysis by the ambient lighting condition analysis module 507. The second ROI may include lower image region that includes the road surface area for analysis of the effects of the ambient lighting on the road surface by ambient lighting effects analysis module 509. The feature extract process may be considered a separation, segmentation, division or segregations of portion(s) of the camera image. That is, it is contemplated that a number of processes may be employed to define the ROI including processing directed to separating portions and parts of the camera image, segmenting portions and parts of the camera image, dividing portions and parts of the camera image, and segregating portions and parts of the camera image. In an exemplary embodiment, for example, it may be desired to monitor the road conditions on different lanes (in lane, left lane, right lane); in such instances, it is necessary to further segment the road region into three ROIs covering left road area, middle road area, and right road area. the same for sky region. By this segmentation, it is possible to examine the road conditions in different lanes, and to determine how each lane is associated with the region of interest above the horizon of the road.

Figure 6A:
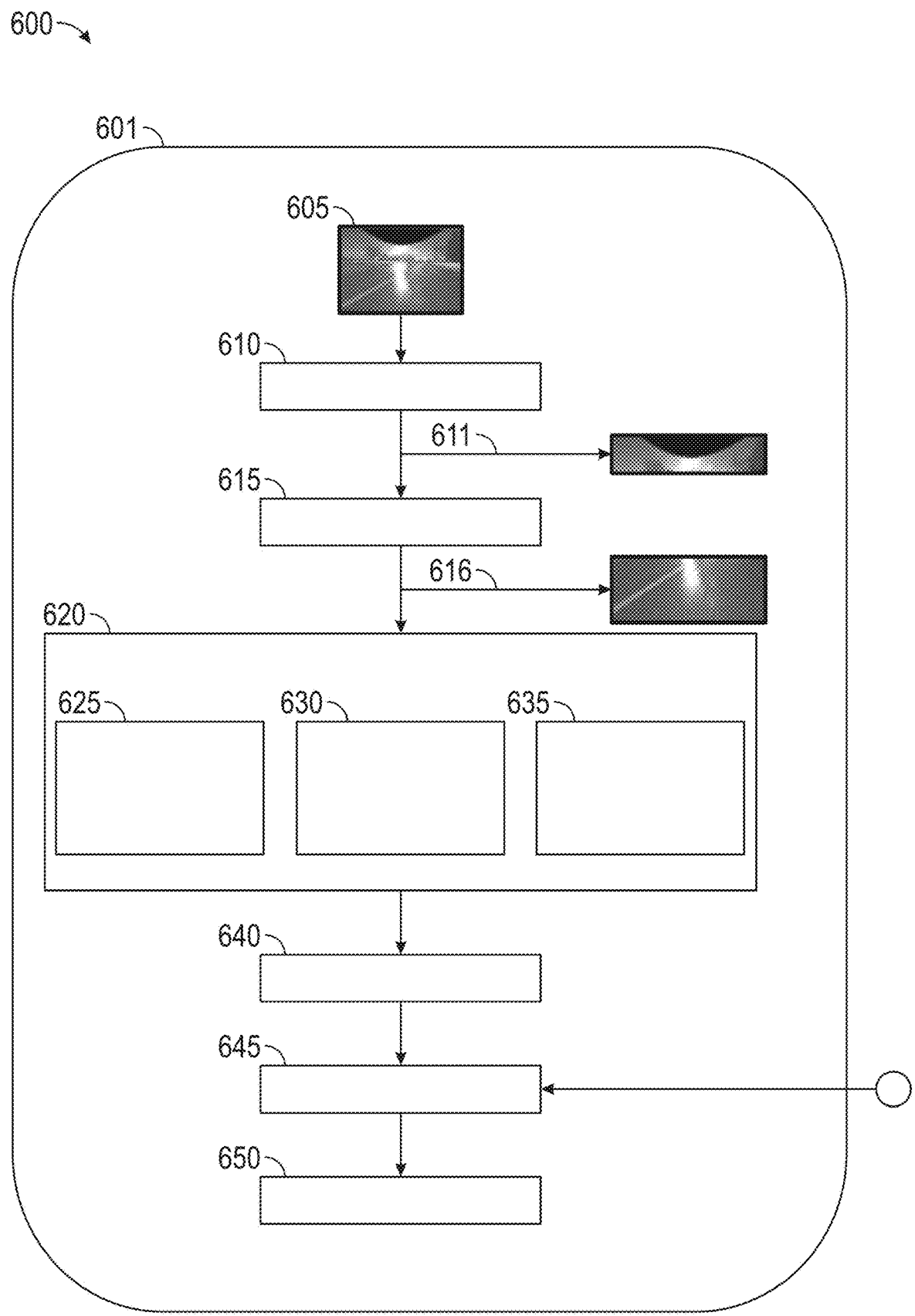
FIGS. 6A and 6B are diagrams that illustrates off-line image training in conjunction with the road surface detection system incorporating ambient lighting analysis, in accordance with various embodiments.
Figure 6B:
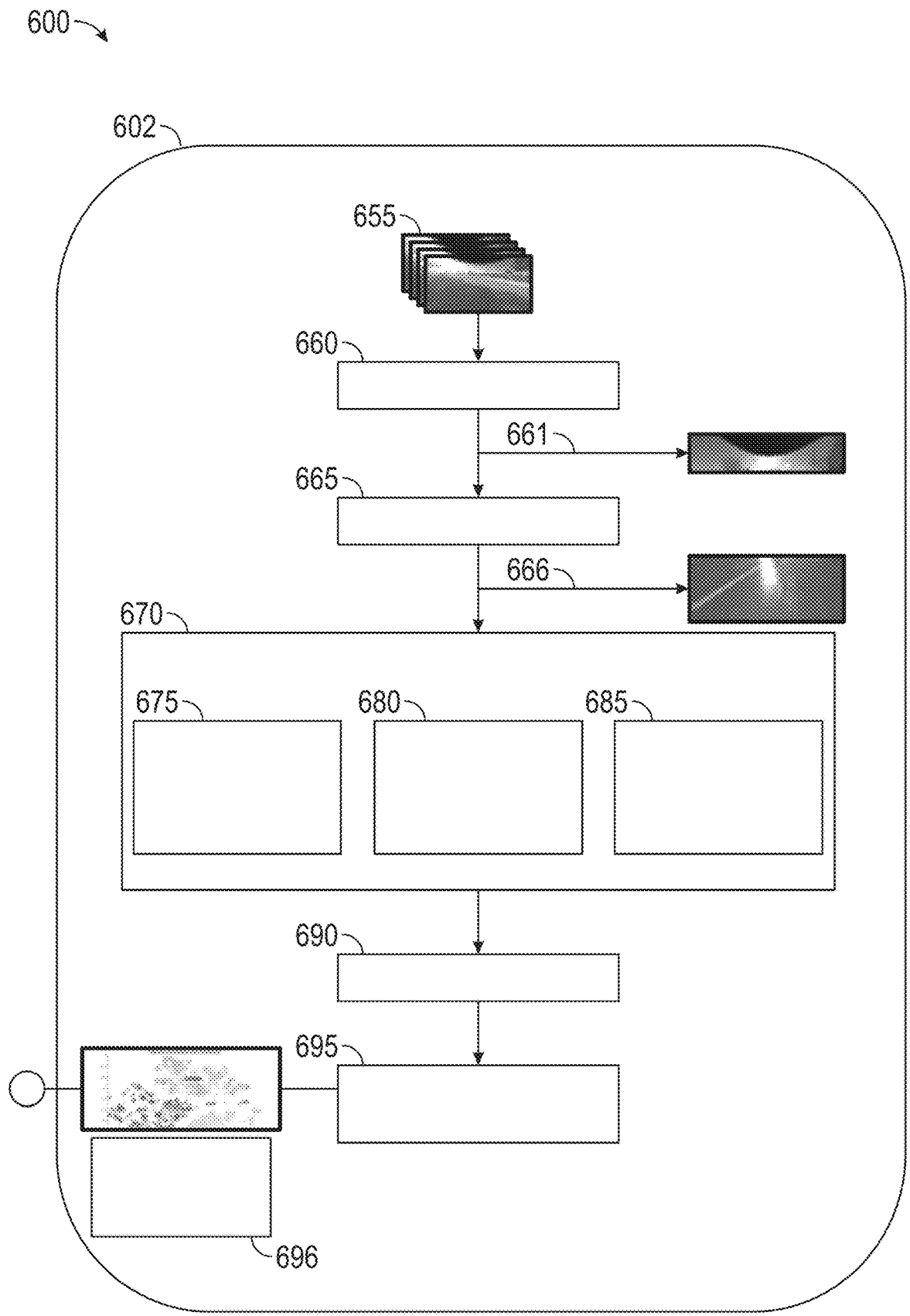

FIGS. 6A and 6B illustrate training of images offline and integrating with the real-time images received from the cameras to the road surface detection system incorporating an ambient lighting analysis. FIG. 6a includes an input image 605 of a scene captured by a camera mounted on the vehicle received in real-time, pre-processing 610 of the image followed by the extracting ROI 615 of the particular captured image scene 611 in parts 616 of the above the road horizon region and the road surface. Next, performing the feature extraction 620, of the ambient lighting condition and scene feature calculation 625, the ambient lighting and scene effects on road surface feature extraction 630, and the overall road surface presentation feature extraction 635. Next, the determining of a list of features 640 and classifying the features in accordance with the classifier 645 is performed. The classifier 645 is obtained by off line to perform the classifying of the images. In FIG. 6B, the off-line classification training begins initially with a training set 655 of images. Processes relating to the pre-processing 600 similar to the real-time pre-processing 610 (of FIG. 6A) are applied to a training scene 661 of the training set 655 of images. Next, the following step of the extracting ROI 665 of the training scene 661 of the parts 666 of the above road region and road surface region is performed. A similar feature extraction off-line 670 is performed to the real-time feature extraction of the ambient lighting condition and scene feature calculation 675, the ambient lighting and scene effects on road surface feature extraction 680, and the overall road surface presentation feature extraction 685. After which, a list of relevant features 690 are determined and a step of a classifier model parameter learning 695 is performed. That is, a classifier with known parameters 696 is utilized to perform the real-time classification 645 of the images. Hence, the classifier 645 is provisioned with a known configuration of classification parameters that will be amended of changed over-time as more images are classified in real-time. The off-line model of classifier model parameter learning 695 may also be synced with the real-time updates in classifier parameters and hence have intelligent learning capabilities incorporated.

Figure 7:
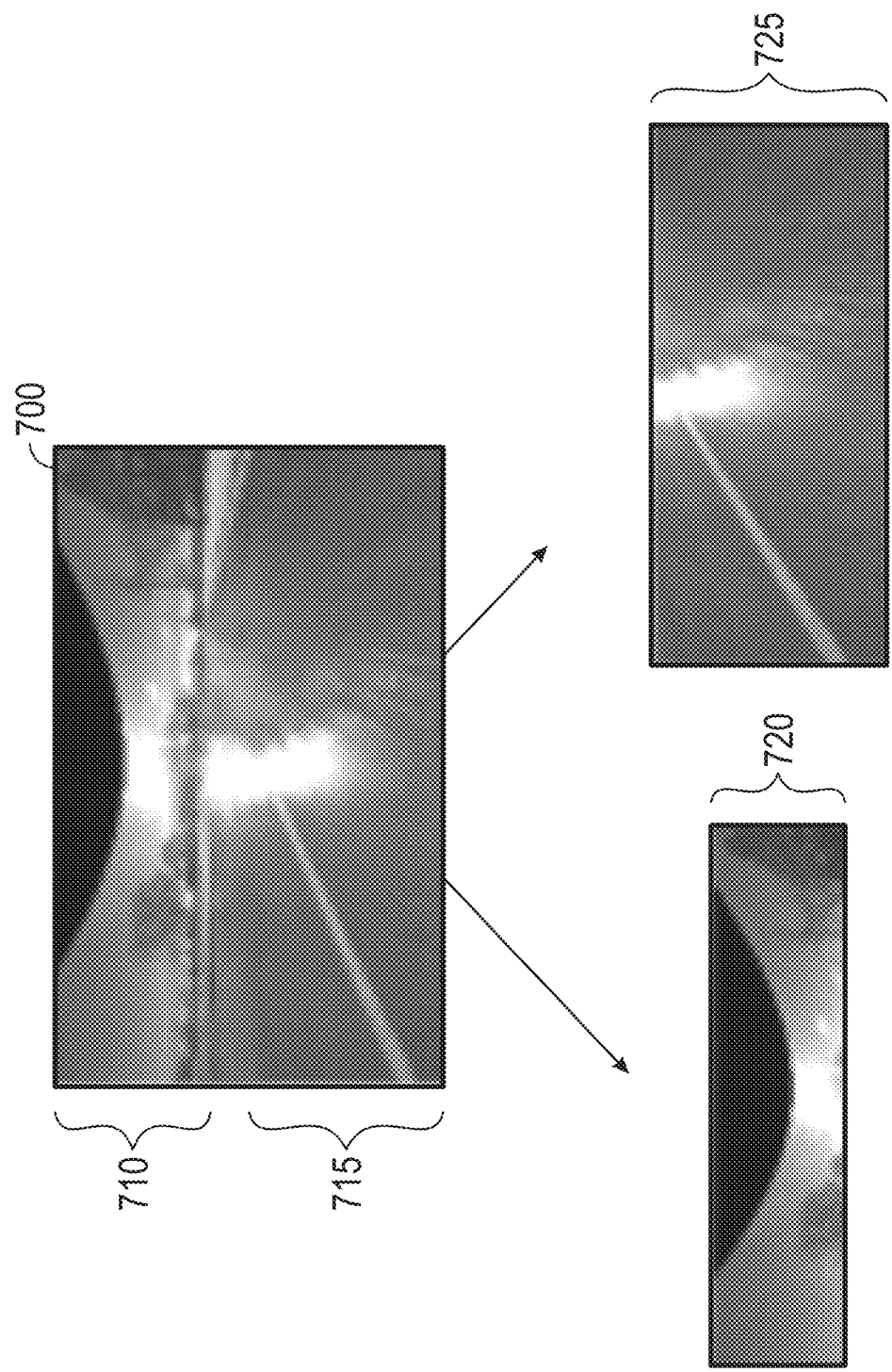
FIG. 7 illustrate images of regions of interest of above the road horizon and road of the entire image scene of the road surface detection system incorporating ambient lighting analysis of FIGS. 1-6 in accordance with various embodiments.

FIG. 7 illustrate images of regions of interest of above the road horizon and road surface of the entire image scene of the road surface detection system incorporating ambient lighting analysis of FIGS. 1-6 in accordance with various embodiments. FIG. 7 illustrates images of regions of interest of the sky and road of the road surface detection system incorporating ambient lighting analysis, the ROI from the extraction module 512 may include a road surface region and above the horizon of the road region (i.e. a sky region). FIG. 7 illustrates the image 700 of both regions of interest of the above the horizon of the road region 710 for the weather and ambient lighting analysis and the road area 715 for the road surface and ambient light analysis. ROI 720 shows the separate, segmented, divided or segregated portion(s) of the image 700 containing the sky for the ambient lighting condition analysis, and ROI 725 shows the separate, segmented, divided, or segregated portion(s) of the image 700 containing the road surface for the road surface analysis.

Returning to FIG. 5, the feature module 525 receives information of features or prominent features extracted by the analysis of the feature extraction module and sub-module analysis. The classifier module 530 in turn, classifies road surface conditions with respect to the features of the features module 525 and determines a road condition classification.

The ambient lighting condition analysis module 507 of the feature extraction module 505 performs a multistep analysis of: receiving red, green, blue (RGB) representations of certain dominant color components of the ROI, analyzes the possibility or determines whether there is one or at least one type of ambient lighting condition through a dominant color component analysis. For example, the dominant color component analysis may involve evaluate aspects of the percentage of dominant color components over the whole ROI through binary conversion with pre-determined thresholds based on data analysis. While the data analysis described performing determinations based on thresholds, alternate data analysis may also be applicable or integrated. For example, tools for data analysis based on color frequency, k-means clustering, and template matching may also be integrated or used in conjunction with the described pre-determined threshold based data analysis.

Figure 8:
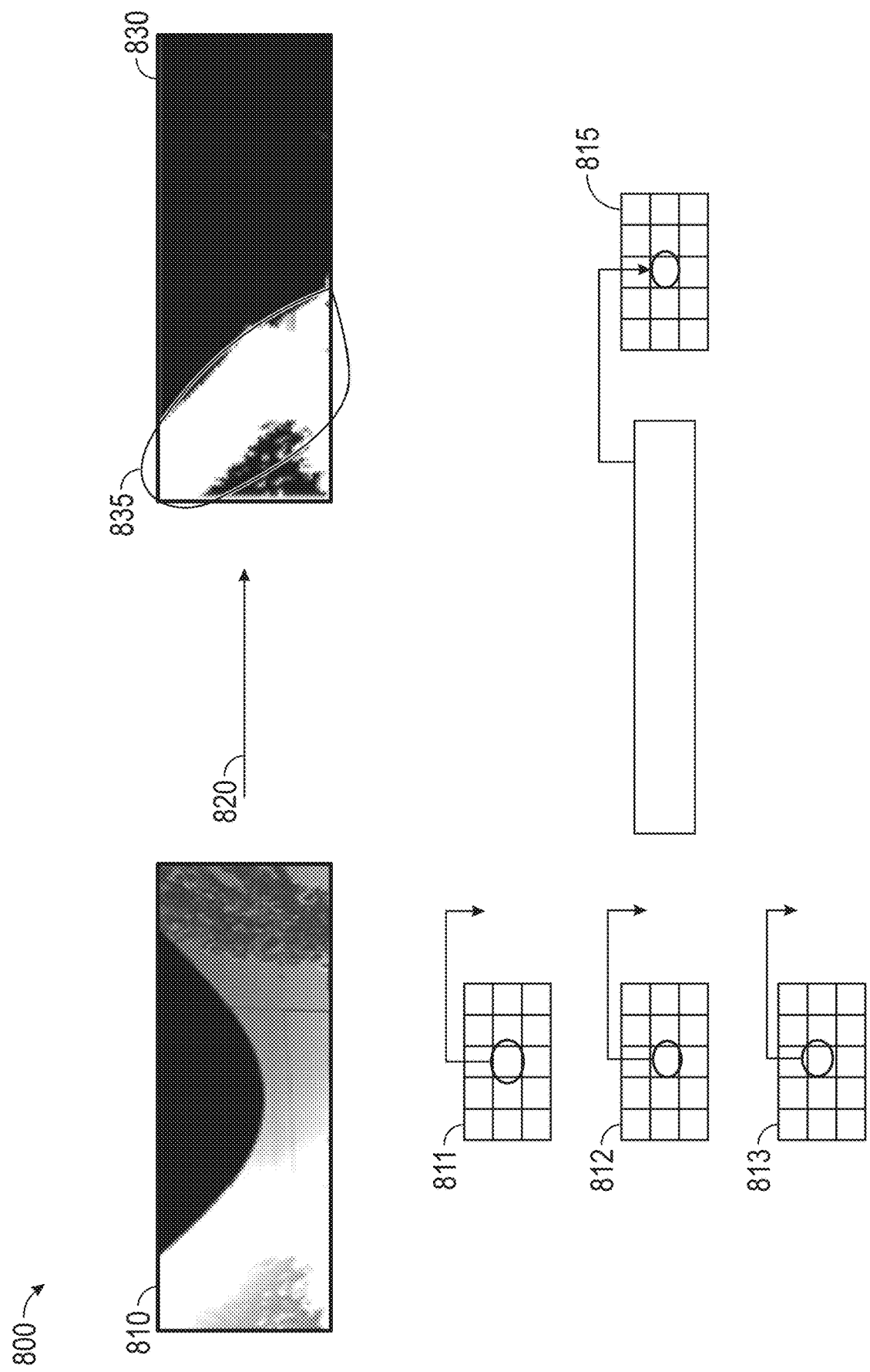
FIG. 8 illustrate images of regions of interest of the sky of the road surface detection system incorporating ambient lighting analysis of FIGS. 1-6 in accordance with various embodiments.

FIG. 8 illustrates images of regions of interest of the sky of the road surface detection system incorporating ambient lighting analysis of FIGS. 1-6 in accordance with various embodiments. In FIG. 8 the ambient lighting condition analysis module 807 of the feature extraction module 805 (of FIG. 4) analysis 800 of the ambient lighting condition is shown. In an exemplary example, an analysis 800 of a percentage of high intensity pixels which meet certain threshold is described. The ROI of an RGB color image 810 of an above the horizon of the road region (i.e. sky region) is segmented into matrices of an R image matrix 811, a G image matrix 812, a B image matrix 813. A threshold comparison is applied by processors of the ambient condition analysis module 507 (of FIG. 5) to each of the RGB image matrices, the threshold comparison function 820 is $\min(I_R(i, j), I_G(i, j), I_B(i, j)) > thr^h$ for a particular binary image matrix 815 with $I_{Bi}(i, j)=1$ to convert the RGB color image 810 to a binary image 830. The feature which is extracted may be determined by a percentage of white pixels equal to the number of white pixels divided by the number of all pixels of the ROI. The binary image 830 of the sky region is shown resulting from the threshold comparison 820. In an exemplary embodiment, in ambient lighting conditions of a sunny sky, white colored pixel will likely constitute a significant or considerable percentage of portions or occupy areas or regions in the ROI or for that matter in the entire camera image. In the exemplary embodiment illustrated in FIG. 8, the percentage for the sunny sky condition determined by the ambient lightening analysis amounts to in the vicinity of 27% or approximately a quarter area of the entire sky region shown by region 835 in the binary image 830. Moreover, the percentage occupation of white pixels is more clearly visible and easier to define in the binary image 830 than in the RGB color image 810.

Returning to FIG. 5, the ambient lighting condition analysis module 507 of the feature extraction module 505 in FIG. 5, may define threshold conditions for analyzing other types of sky lighting to be extracted based on data analysis of the binary image conversion (binary image 830 converted as example in FIG. 8). In various exemplary embodiments, the features and color character of sky presentations are based on various threshold conditions. For sunny sky images, with color character of a very high intensity for all colors with $thr^h=250$, the threshold would be $\min(I_R, I_G, I_B)>thr^h$ and bright pixels are converted into white pixels in the binary image. For clear sky images, with a color character of blue saturated high intensity pixels with saturation level $s(*)=1.2$ and $thr^h=200$, the threshold condition would be $I_B>s*\max(I_R, I_G)$ and $I_B>thr^h$ with blue saturated high intensity pixels will be converted into white pixels in binary image. For dark cloudy sky images with a color character of blue-dominant pixels that are not saturated with $s=1.2$, the threshold condition is $\max(I_R, I_G)<I_B<s*\max(I_R, I_G)$. For green-covered sky images, the color character is green-dominant pixels with a threshold condition of $I_G>\max(I_R, I_B)$. For each type of sky presentation and image, a percentage of white pixels divided by the number of pixels of the entire binary image is calculated to determine the white pixel percentage. The percentages determined or extracted of pixels for all the listed sky types are then extracted or associated as prominent features in features module 525 for the road condition classification in classifier module 535.

Figure 9:
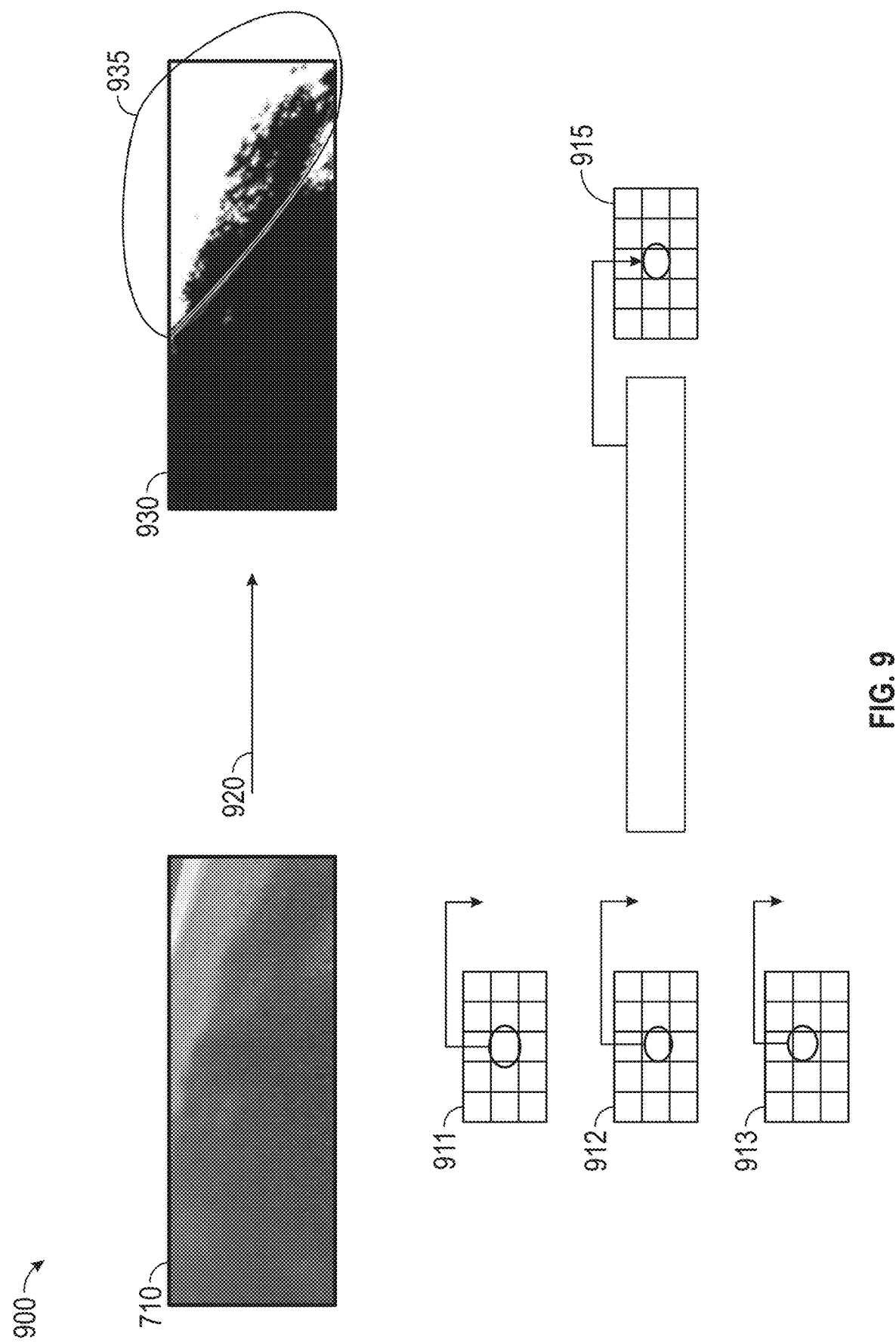
FIG. 9 illustrate images of effects of sunlight projected on a road surface in analysis of regions of interest of the road surface detection system incorporating ambient lighting analysis of FIGS. 1-6 in accordance with various embodiments.

FIG. 9 illustrate images of effects of sunlight projected on a dry surface in analysis of regions of interest of the road of the road surface detection system incorporating ambient lighting analysis of FIGS. 1-6 in accordance with various embodiments. FIG. 9 shows images of regions of interest of the road of the road surface detection system incorporating ambient lighting analysis of FIGS. 1-6 in accordance with various embodiments. In FIG. 9 the ambient lighting effects on road surfaces analysis module 509 of the feature extraction module 505 (of FIG. 5) analysis of the ambient lighting effects on road surfaces is shown. In an exemplary example, ambient lighting effect on road surface can also be examined through dominant color component analysis described earlier. Similar to previous analysis by the ambient lighting condition module 507 (of FIG. 5), the percentage of dominant color components over the whole ROI image region (but in this instance on the road) is calculated through using a binary image conversion process.

In an exemplary embodiment, of sunlight effect detection on a road surface, the ambient lighting effects on road surfaces analysis module 509 (of FIG. 5) by the analysis 900 evaluates the percentage of yellow-saturated high intensity pixels (with $thr^h=200$ and $s=1.2*$). An analysis 900 of the percentage of yellow-saturated high intensity pixels which meet certain threshold is described. The ROI of an RGB color image 910 of a road surface region is segmented into matrices of an R image matrix 911, a G image matrix 912, a B image matrix 913. A threshold comparison is applied by processors of the ambient lighting effects road surface analysis module 509 (of FIG. 5) to each of the RGB image matrices, the threshold comparison function 920 is $\min(I_R, I_G)>s*I_B$ & $\min(I_R, I_G)>thr^h$ for a particular binary image matrix 915 with $I_{Bi}(i, j)=1$ to convert the RGB color image 910 to a binary image 930. The feature which is extracted may be determined by a percentage of white pixels equal to the number of white pixels divided by the number of all pixels of the ROI. The binary image 930 of the road surface region is shown resulting from the threshold comparison 920. In an exemplary embodiment, in ambient lighting effects on the road surface on a sunny day, yellow-saturated light intensity pixels (which are white colored pixel in the binary image 930) will likely constitute a significant or considerable percentage of portions or occupy areas or regions in the ROI or for that matter in the entire camera image. In the exemplary embodiment illustrated in FIG. 9, the percentage for the sunny day determined by the ambient lightening analysis of the effect on the road surface amounts to in the vicinity of 30% or approximately one third area of the entire road surface region shown by region 935 in the binary image 930. Moreover, the percentage occupation of white pixels is more clearly visible and easier to define in the binary image 930 than in the RGB color image 910.

Returning to FIG. 5, the ambient lighting effects on road surfaces analysis module 509 of the feature extraction module 505 in FIG. 5, may define threshold conditions for analyzing other types of road surfaces to be extracted based on data analysis of the binary image conversion (binary image 930 converted as example in FIG. 9). In various exemplary embodiments, the features and color character of road surfaces presentations are based on various threshold conditions. For images, with a shadow on snow and dry road (with light color) surfaces, the color character is low-intensity cyan-dominant (green combined with blue) pixels with $thr^l=100$ with a threshold condition of $thr^l>\min(I_G, I_R)>I_R$. For images, of a shadow on wet and dry Road (with darker color) surfaces with a color character of low-intensity yellow-dominant (red combined with green) pixels with $thr^l=100$, the threshold condition is $thr^l>\min(I_R, I_G)>I_B$. For images, with sunlight on the road surface, the color character is yellow-saturated high intensity pixels with $thr^h=100\times N$ where $N=2\ldots$ and $s=N$, where $N=1.2\ldots$ the threshold condition is $\min(I_R, I_G)>s*I_B$ and $\min(I_R, I_G)>thr^h$.

For images with various other effects of ambient light on the road surface, other or different color features can be used or used in conjunction to improve the road surface detection of the ambient light effects. That is, in exemplary embodiments other color features shown as follows: $thr_R^l<I_R<thr_R^h$, $thr_G^l<I_G<thr_G^h$, $thr_B^l<I_B<thr_B^h$ with various exemplary examples such as dark pixels due to a wet surface: $I_R<64$, $I_G<64$, $I_B<64$; with bright pixels due to sunlight directly reflected on a wet surface $I_R>220$, $I_G>220$, $I_B>220$; and with normally dry surface or sunlight reflected on a wet surface $100<I_R<165$, $100<I_G<165$, $100<I_B<165$. It should be contemplated that the values or specific numbers for the color features are not fixed and are tunable or configurable based on the image formation characteristics of a specific camera type or model in use. That is, different types of cameras and models may have or may warrant different color feature values because of different color degrees associated with particular camera types or models. For each type of light effect on road surface, a percentage of white pixels divided by the number of pixels of the entire binary image is calculated to determine the white pixel percentage. The percentages determined or extracted of pixels for all the listed ambient light effects on a road surface are then extracted or associated as prominent features in features module 525 for the road condition classification in classifier module 535.

In various embodiments, exemplary features for surface classification by the classifier module 535 for features for evaluating ambient lighting (based on white pixels of binary sky image, for features for evaluating lighting effect on road surface (based on white pixels of binary surface image), and for features for evaluating overall road surface presentation may be classified. For example, for features for evaluating ambient lighting (based on white pixels of binary sky image) for various sky evaluations and subsequent road surface classifications may be as follows: on the percentage of high intensity blue/red/green pixels with respect to the sky region for a sunny sky evaluation; on the percentage of blue saturated high intensity pixels with respect to sky region for clear sky evaluation; on the percentage of blue-dominant pixels that are not saturated with respect to the sky region for dark cloud evaluation; and on the percentage of green dominant pixels with respect to sky region for green tree coverage evaluation etc. For features for evaluating lighting effect on road surface (based on white pixels of binary surface image), the classifications may be as follows: on the percentage of low-intensity cyan-dominant (green combined with blue) pixels over road surface region for shadow analysis on snow/dry surfaces; on the percentage of low-intensity yellow-dominant (red combined with green) pixels over road surface region for shadow analysis on wet and dry surfaces; on the percentage of yellow-saturated high intensity pixels over road surface region for sunlight effect and others. For features for evaluating overall road surface presentation, the classifications may be as follows: on the mean of the surface intensities, on the variance of the surface intensities, on the average hue, intensity and brightness and others.

Figure 10A:
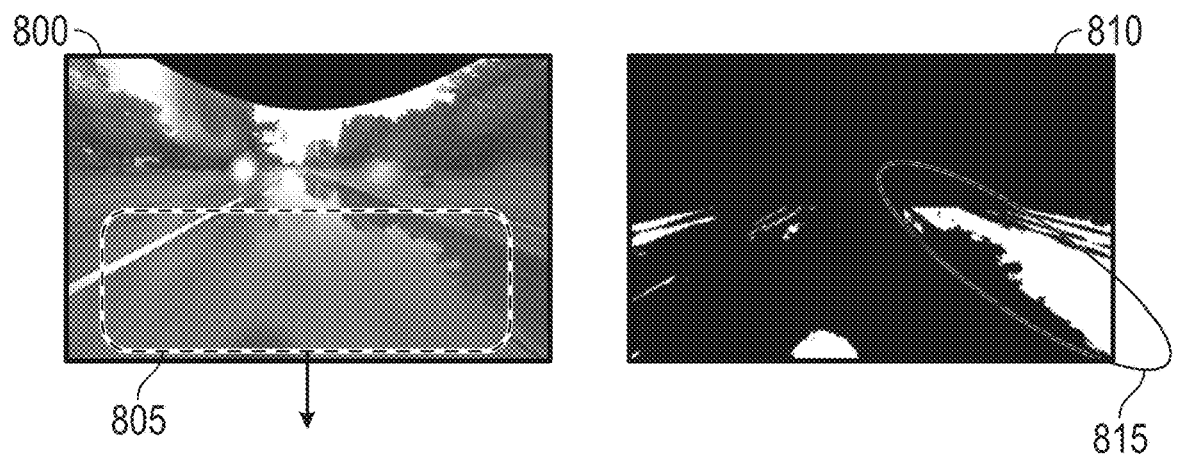
FIGS. 10A, 10B, and 10C illustrate images of entire scene including wet surface and the effects of shadows reflected on the surface, as well as the surrounding of the entire scene in particular regions of interest analyzed by the road surface detection system incorporating ambient lighting analysis of FIGS. 1-6 in accordance with various embodiments.
Figure 10B:
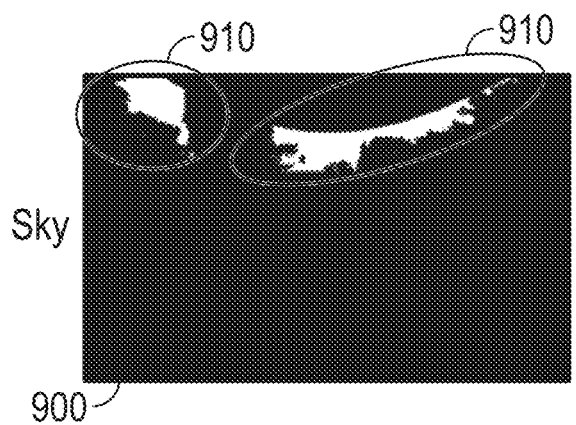
Figure 10C:
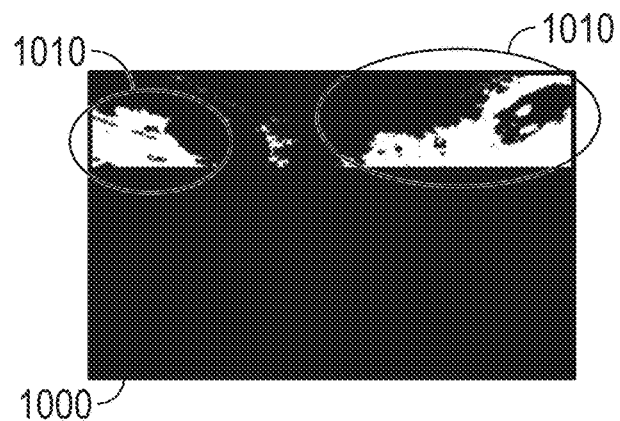

FIGS. 10A, 10B, and 10C illustrate images of entire scene captured and the effects of shadows reflected on the surface, as well as the surrounding of the entire scene in particular regions of interest analyzed by the road surface detection system incorporating ambient lighting analysis of FIGS. 1-6 in accordance with various embodiments. FIG. 10A illustrate images of regions (ROI) of interest of the wet road surface of the road surface detection system incorporating ambient lighting analysis of FIGS. 1-6 in accordance with various embodiments. FIG. 10A shows a wet road surface of ROI 800 with sky brightness and green trees reflected on the surface 805. A 19% percentage 815 of green trees reflected on the surface in ROI 810 of a binary image.

FIG. 10B illustrate images of regions of interest of the wet road surface of the road surface detection system incorporating ambient lighting analysis of FIGS. 1-6 in accordance with various embodiments. FIG. 10B shows a wet road surface of ROI 900 with 16% sky 910 in a binary image.

FIG. 10C illustrate images of regions of interest of the wet road surface of the road surface detection system incorporating ambient lighting analysis of FIGS. 1-6 in accordance with various embodiments. FIG. 10C shows a wet road surface of ROI 1000 with 32% trees 1010 in a binary image.

Figure 11A:
FIGS. 11A, 11B, 11C, 11D, 11E and 11F illustrate images of an entire image scene including dry surface, and the effects of a shadow, sunlight, sunny sky, clear blue sky, trees of particular regions of interest which compose the entire image scene analyzed by the road surface detection system incorporating ambient lighting analysis of FIGS. 1-6 in accordance with various embodiments.
Figure 11B:
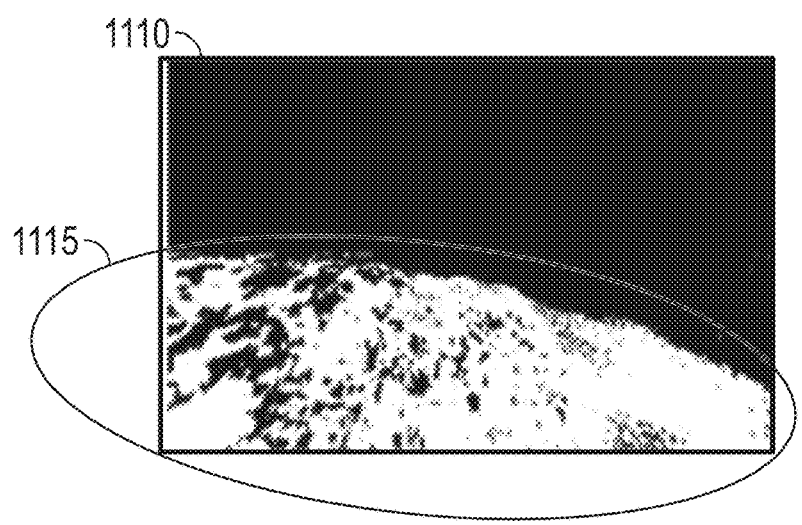
Figure 11C:
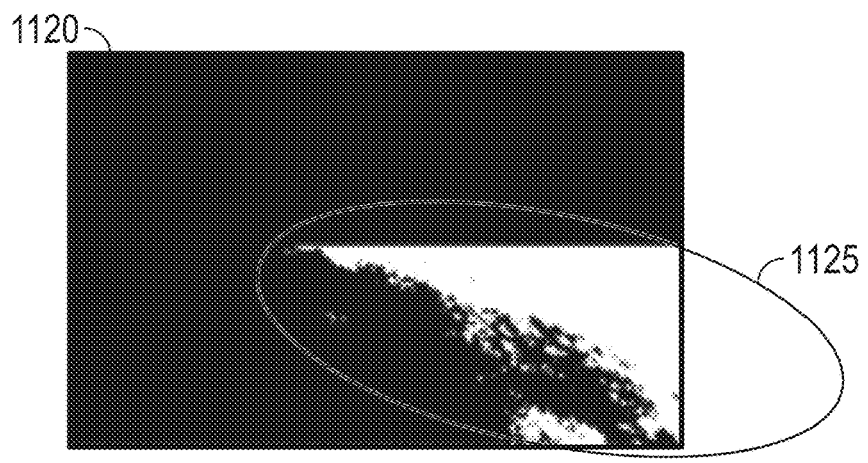

FIGS. 11A, 11B, 11C, 11D, 11E and 11F illustrate images of an entire image scene, and the effects of a shadow, sunlight, sunny sky, clear blue sky, trees of particular regions of interest which compose the entire image scene analyzed by the road surface detection system incorporating ambient lighting analysis of FIGS. 1-6 in accordance with various embodiments. FIG. 11A illustrate an entire image scene composed of images of regions of interest of the dry road surface of the road surface detection system incorporating ambient lighting analysis of FIGS. 1-6 in accordance with various embodiments. FIG. 11B shows an image 1100 of a dry road surface with a 62% shadow 1115 in the binary image 1110 and FIG. 11C shows a 30% sunlight 1125 in the binary image 1120.

Figure 11D:
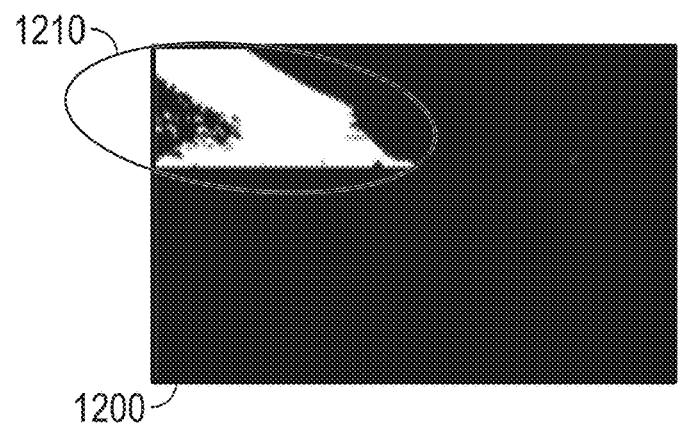

FIG. 11D illustrate images of regions of interest of the sunny sky of the road surface detection system incorporating ambient lighting analysis of FIGS. 1-6 in accordance with various embodiments. FIG. 11D shows a binary image 1200 of a dry road surface with a 27% sunny sky 1210.

Figure 11E:
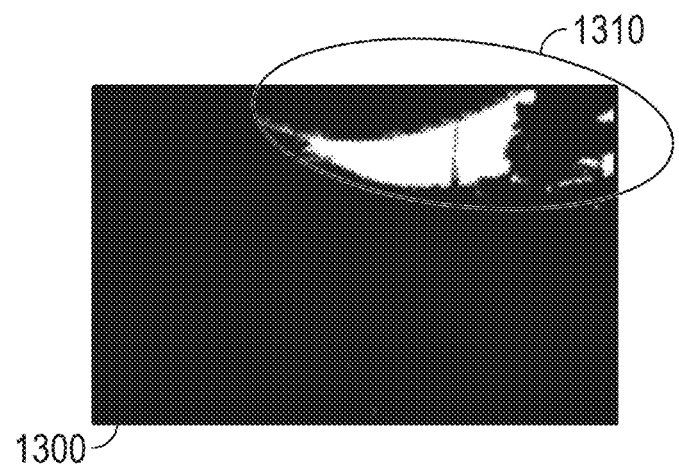

FIG. 11E illustrate images of regions of interest of the clear blue sky of the road surface detection system incorporating ambient lighting analysis of FIGS. 1-6 in accordance with various embodiments. FIG. 11E shows a binary image 1300 of a dry road surface with a 20% clear blue sky 1310.

Figure 11F:
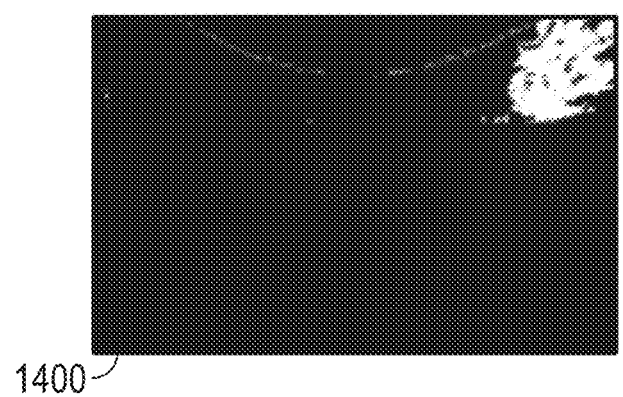

FIG. 11F illustrate images of regions of interest of the trees of the road surface detection system incorporating ambient lighting analysis of FIGS. 1-6 in accordance with various embodiments. FIG. 11F shows a binary image 1400 of a dry road surface with a 15% trees 1410.

Figure 12:
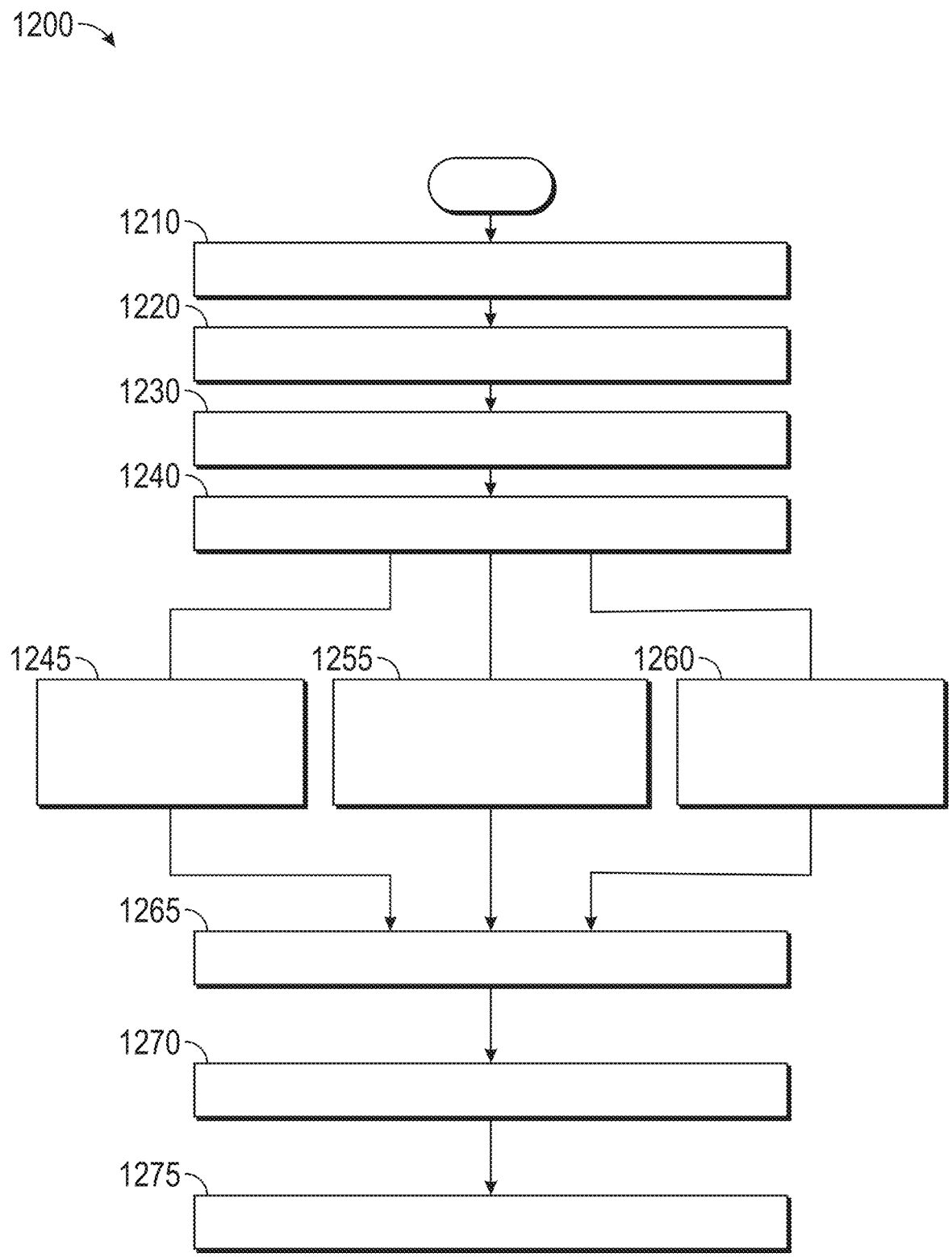
FIG. 12 is a flowchart illustrating the steps of is a flowchart illustrating the steps of an ambient light analysis with road surface detection method, in accordance with an embodiment.

FIG. 12 is a flowchart illustrating the steps of an ambient light analysis with road surface detection method, in accordance with an embodiment. In FIG. 12, process 1200 illustrates tasks of a road surface detection system incorporating ambient lighting analysis, in accordance with various embodiments. In particular FIG. 12 shows a process steps of the road surface detection system 500 of FIG. 5 in more detail with continued reference to FIGS. 1 to 6. FIG. 5 of a framework for ambient lighting analysis which includes a feature extraction module 505 with processors of various modules performing analysis of aspects of ambient lighting on conditions, effects on road surfaces and presentation of image analysis.

At 1210, tasks for receiving camera images from image sensing devices of a vehicle for feature extraction are received. Next at 1220, tasks for pre-processing the camera images by noise removal, image re-projection, downsizing, etc. After this initial pre-processing of the camera image, at 1230 tasks for identifying a region of interest (ROI) of the camera image by the ROI extraction module are executed. The tasks 1230 for ROI extraction relate to dividing camera images in ROIs of a road surface and an above the road horizon (i.e. including other surroundings of a sky, trees, etc.). In instance, the ROI extraction task 1230 may extract or determine two ROIs for further processing. The first ROI may include an upper image region of the camera image of sky area for weather and ambient lighting condition analysis by the ambient lighting condition analysis module 507 (of FIG. 5). The second ROI may include lower image region that includes the road surface area for analysis of the effects of the ambient lighting on the road surface by ambient lighting effects analysis module 509 (of FIG. 5). Tasks relating to the extract process may be considered a separation, segmentation, division or segregations of portion(s) of the camera image. That is, it is contemplated that a number of process tasks may be employed to define the ROI including processing directed to separating portions and parts of the camera image, segmenting portions and parts of the camera image, dividing portions and parts of the camera image, and segregating portions or parts of the camera image.

Next, at 1240, tasks related to feature extraction are performed by process steps of the feature extraction module 505 (of FIG. 5) to determine by the ROI received the appropriate flow for which ambient light analysis to perform of ambient light analysis, ambient lighting effects on road surfaces analysis, and analysis of the overall road surface presentation. For example, if the flow proceeds to 1245, tasks related to process steps of the ambient light condition module 507 (of FIG. 5) can be executed for analysis of ambient lighting conditions. If the flow proceeds to 1250, tasks relating to an ambient lighting effects module 509 (of FIG. 5) for analysis of ambient lighting effects on road surfaces can be executed, and if the flow proceeds to 1260, task relating to overall road surface presentation module 511 (of FIG. 5) for analysis of overall road surface presentation.

Next, the flow proceeds to 1265 for tasks relating to process steps of the feature module 525 (of FIG. 5) to process information of features or prominent features extracted by the analysis of the feature extraction module and sub-module analysis. Next at 1270, tasks related to process steps of the classifier module 530 (of FIG. 5) are executed to classify road surface conditions with respect to the features of the features module and determine a road condition classification.

This architectural configuration employed in the process of exemplary embodiments of the present disclosure, is a parallel architecture of analysis of the ROI, however other architectures can be used. That is, serial processing of the image data may be employed or a combination of a partial parallel and a partial serial pipeline architectures is also a possibility. For example, if determinations or pre-set configurations of ROIs or cameras positioned then serially processing of select ambient lighting conditions or effects of road surfaces may be employed.

Finally, at 1275, tasks relating to displaying or sending the results of the ambient lighting analysis are executed. For example, the results may be sent to third parties or displayed to the user, or used for control and configurations of vehicle setting during operation in real time.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A surface detection system for detecting surface conditions comprising:
an image scene captured by a camera wherein the image scene comprises: a set of a plurality of regions of interest (ROIs); and a processor configured to receive the image scene to:
extract at least a first and a second ROI from the set of the plurality of ROIs of the image scene;
associate the first ROI with an above-horizon region and associate the second ROI with a surface region;
analyze the first ROI and the second ROI in parallel for a condition related to an ambient lighting in the first ROI and for an effect related to the ambient lighting in the second ROI; and
extract from the first ROI features of the condition of the ambient lighting and extract from the second ROI features of the effect of the ambient lighting on a surface region.

2. The surface detection system of claim 1, further comprising:
analyzing the second ROI to extract the features of the effects of the ambient lighting on the surface region in common with the features of the first ROI of the conditions of ambient lighting based on a plurality of image attributes wherein a set of extracted features from the first and second ROIs comprise: a common set of features for both ROIs.

3. The surface detection system of claim 2, wherein the image attributes comprise: a set of one or more of a texture, a brightness and a color information.

4. The surface detection system of claim 3, further comprising:
generating the common set of features for both the ROIs based on combining the plurality of image attributes of the second ROI with that of the first ROI.

5. The surface detection system of claim 4, further comprising:
classifying by a classifier each of the common set of features to a particular surface type.

6. The surface detection system of claim 1, further comprising:
an autonomous, semi-autonomous, or non-autonomous vehicle system, or non-vehicular applications.

7. The surface detection system of claim 1, wherein the processor is configured to:
determine, by thresholds related to values of pixels of the first ROI, features of the condition of the ambient lighting and, by thresholds related to values of pixels of the second ROI, features of the effect of the ambient lighting on the surface region.

8. A method for detecting a surface condition, the method comprising:
capturing an image scene by a camera wherein the image scene comprises: a set of a plurality of regions of interest (ROIs);
extracting, by a processor associated with the vehicle, at least a first and a second ROI from the set of the plurality of ROIs of the image scene;
associating, by the processor, the first ROI with an above-horizon region and associating the second ROI with a surface region;
analyzing, by the processor, the first ROI and the second ROI in parallel for a condition related to an ambient lighting in the first ROI and for an effect related to the ambient lighting in the second ROI; and
extracting, by the processor from the first ROI, features of the condition of the ambient lighting and extracting, from the second ROI, features of the effect of the ambient lighting on a surface region.

9. The method of claim 8, further comprising:
an autonomous, semi-autonomous, non-autonomous driving method, or non-driving use.

10. The method of claim 8, further comprising:
taking an action by the processor based on a feature of the surface condition or the effect on a surface related to vehicle control.

11. The method of claim 8, further comprising:
taking an action by the processor based on the surface condition or the effect on a surface of sending a notification for notifying of a particular surface condition or effect on the surface.

12. The method of claim, 8, further comprising:
analyzing, by the processor, the second ROI to extract the features of the effects of the ambient lighting on the surface region in common with the features of the first ROI of the conditions of ambient lighting based on a plurality of image attributes wherein a set of extracted features from the first and second ROIs comprise: a common set of features for both ROIs.

13. The method of claim 12, wherein the image attributes comprise: a set of one or more of a texture, a brightness and a color information.

14. The method of claim 13, further comprising:
generating, by the processor, the common set of features for both the ROIs based on combining the plurality of image attributes of the second ROI with that of the first ROI.

15. A surface detection apparatus, comprising:
a camera for generating images wherein the images comprise: regions of interest (ROI);
a processor, configured to receive the images to:
extract at least a first and a second ROI from the set of the plurality of ROIs of the image scene;
associate the first ROI with an above-horizon region and associate the second ROI with a surface region;
analyze the first ROI and the second ROI in parallel for a condition related to an ambient lighting in the first ROI and for an effect related to the ambient lighting in the second ROI; and
extract from the first ROI features of the condition of the ambient lighting and extract from the second ROI features of the effect of the ambient lighting on a surface region.

16. The apparatus of claim 15, further comprising:
an autonomous, semi-autonomous or conventional driving apparatus.

17. The apparatus of claim 15, further comprising:
a cloud connected apparatus to send messages of surface conditions to third party networks.

18. The apparatus of claim 15, further comprising:
the processor is configured to:
determine, by thresholds related to values of pixels of the first ROI, features of the condition of the ambient lighting and, by thresholds related to values of pixels of the second ROI, features of the effect of the ambient lighting on the surface region.

19. The apparatus of claim 15, further comprising:
the processor is configured to:
analyze the second ROI to extract the features of the effects of the ambient lighting on the surface region in common with the features of the first ROI of the conditions of ambient lighting based on a plurality of image attributes wherein a set of extracted features from the first and second ROIs comprise: a common set of features for both ROIs;
generate the common set of features for both the ROIs based on combining the plurality of image attributes of the second ROI with that of the first ROI; and
classify, by a classifier, each of the common set of features to a particular surface type.

* * * * *